(12) United States Patent
Klehr

(10) Patent No.: US 10,612,990 B2
(45) Date of Patent: Apr. 7, 2020

(54) PRESSURE SENSOR ASSEMBLY AND MEASUREMENT CONVERTER FOR PROCESS INSTRUMENTATION COMPRISING THE PRESSURE SENSOR ASSEMBLY

(71) Applicant: Siemens Aktiengesellschaft, Munich (DE)

(72) Inventor: Stefan Klehr, Rheinzabern (DE)

(73) Assignee: Siemens Aktiengesellschaft, Munich (DE)

( * ) Notice: Subject to any disclaimer, the term of this patent is extended or adjusted under 35 U.S.C. 154(b) by 173 days.

(21) Appl. No.: 15/755,943

(22) PCT Filed: Feb. 24, 2016

(86) PCT No.: PCT/EP2016/053820
§ 371 (c)(1),
(2) Date: Feb. 27, 2018

(87) PCT Pub. No.: WO2017/036608
PCT Pub. Date: Mar. 9, 2017

(65) Prior Publication Data
US 2018/0252605 A1    Sep. 6, 2018

(30) Foreign Application Priority Data

Aug. 31, 2015   (DE) .................. 10 2015 216 624

(51) Int. Cl.
*G01L 9/00*    (2006.01)
*G01L 19/06*   (2006.01)
*G01L 19/00*   (2006.01)

(52) U.S. Cl.
CPC ........ *G01L 9/0048* (2013.01); *G01L 19/0023* (2013.01); *G01L 19/0038* (2013.01); *G01L 19/0618* (2013.01); *G01L 19/0627* (2013.01)

(58) Field of Classification Search
CPC .......................... G01L 9/0048; G01L 19/0023
See application file for complete search history.

(56) References Cited

U.S. PATENT DOCUMENTS

| 4,433,579 A | 2/1984 | Horn |
| 5,763,784 A | 6/1998 | Biskup |

(Continued)

FOREIGN PATENT DOCUMENTS

| CN | 101464198 | 6/2009 |
| CN | 102967408 | 3/2013 |

(Continued)

OTHER PUBLICATIONS

"Load cell and weigh handbook" von Rice Lake Weighing Systems; pp. 1-58; XP055271990 May 11, 2016, Figure 1-4.

(Continued)

*Primary Examiner* — Jamel E Williams
(74) *Attorney, Agent, or Firm* — Cozen O'Connor

(57) ABSTRACT

A pressure sensor assembly that includes a tube, wherein a membrane to which the pressure to be measured is applied is arranged in the cross-section of the tube, where the membrane has a high flexural rigidity in its central region and is mounted in an elastic manner in the axial direction in the edge region in the tube, two limbs are used to elastically mount the membrane, the mutually facing sides of the two limbs being provided with elongation sensors for detecting an axial movement of the membrane, the movement depending on the pressure to be measured, and where the sensors advantageously do not contact the process medium and a pressure-tight feedthrough for electric signals is not required such that the pressure sensor assembly has a particularly simple structural design and can be used advantageously in measurement converters for process instrumentation.

7 Claims, 3 Drawing Sheets

(56) References Cited

U.S. PATENT DOCUMENTS

| | | | |
|---|---|---|---|
| 5,796,007 A | 8/1998 | Panagotopulos et al. | |
| 2002/0020221 A1 | 2/2002 | Sittler et al. | |
| 2002/0073782 A1 | 6/2002 | Chevallet et al. | |
| 2003/0172744 A1 | 9/2003 | Matsuzawa | |
| 2011/0167918 A1 | 7/2011 | Dukart et al. | |
| 2013/0239694 A1 | 9/2013 | Seto et al. | |
| 2014/0216145 A1 | 8/2014 | Haussner et al. | |
| 2017/0309432 A1 | 10/2017 | Lell | |

FOREIGN PATENT DOCUMENTS

| | | | | |
|---|---|---|---|---|
| CN | 103308241 | 9/2013 | | |
| CN | 103471760 | 12/2013 | | |
| CN | 103759880 | 4/2014 | | |
| DE | 3108017 | 9/1982 | | |
| DE | 9300776 | 5/1993 | | |
| DE | 4333753 | 5/1994 | | |
| DE | 19608321 | 8/1997 | | |
| DE | 60126726 | 11/2007 | | |
| DE | 102013101177 | 8/2014 | | |
| DE | 2015100525 | 4/2015 | | |
| EP | 2294376 | 3/2011 | | |
| TW | 200303981 | 9/2003 | | |
| WO | WO2005121737 | 12/2005 | | |
| WO | WO-2005121737 A1 * | 12/2005 | ......... | G01L 19/0618 |

OTHER PUBLICATIONS

Office Action dated Jun. 26, 2019 issued in Chinese Patent Application No. 201680046978.9.

\* cited by examiner

PRESSURE SENSOR ASSEMBLY AND MEASUREMENT CONVERTER FOR PROCESS INSTRUMENTATION COMPRISING THE PRESSURE SENSOR ASSEMBLY

CROSS-REFERENCE TO RELATED APPLICATIONS

This is a U.S. national stage of application No. PCT/EP2016/053820 filed 24 Feb. 2016. Priority is claimed on German Application No. 102015216624.4 filed Aug. 31, 2015, the content of which is incorporated herein by reference in its entirety.

BACKGROUND OF THE INVENTION

1. Field of the Invention

The invention relates to a pressure sensor arrangement having a membrane arranged in a cross-section of its tube and on which the pressure to be measured acts, and relates to a measuring transducer for process instrumentation having the pressure sensor arrangement.

2. Description of the Related Art

In process engineering plant, a wide variety of field devices are used for process instrumentation for the purpose of controlling processes. Measuring transducers serve to detect process variables such as the temperature, pressure, flowrate, filling level, density or gas concentration of a medium. Actuating elements can affect running of the process in dependence on detected process variables, in accordance with a strategy predetermined by a programmable logic controller or a control station. Examples of actuating elements that may be mentioned are a control valve, a heating system or a pump. In particular in industrial plants, pressure measuring transducers represent essential sensor components within the context of automated production sequences. For optimum behavior of the plant and for a constantly high product quality, high-quality measuring transducers that deliver measured values that are stable in the long term and have a low error rate, even under extreme conditions, are required.

DE 196 08 321 C2 discloses a pressure sensor arrangement having an overload protection system, where this pressure sensor arrangement can be used as a sensor or a measuring cell in a measuring transducer for differential pressure. The conventional measuring cell is filled with oil so that the actual pressure sensor is separated from a possibly aggressive process medium. The overload protection system comprises a plurality of mutually corresponding membranes and an oil filling device that is exactly adapted thereto. The construction of a measuring cell of this kind is thus relatively complicated, and a plurality of welding steps is required to manufacture the measuring cell. Moreover, the tolerance chains of the geometry of the parts, the properties of the materials and the welding parameters are subject to high requirements for precision. For example, the electrical contacts of the actual pressure sensor must be guided through glass leadthroughs that are resistant to high pressure, out of the pressurized interior of the measuring cell and into an electronic unit in which signal processing is performed to determine the measured value of the pressure. Moreover, the measuring cell is only vacuum-tight to a certain extent, and can also only be used in a relatively limited temperature range. The measuring cell cannot be used for hygienic applications in which it is absolutely imperative to avoid the risk of contaminating the process medium with oil.

EP 2 294 376 B1 discloses a further pressure sensor arrangement. Here, a membrane having a plurality of mutually angled membrane portions is used to detect pressure. One membrane portion is arranged in the cross section of a pressurized tube, as a separating membrane, and a membrane portion at an angle thereto is arranged in the region of the pressurized tube wall, as a side wall membrane. A pressure differential applied at the separating membrane results in a deformation thereof that is transmitted to the side wall membrane as a result of a fixed angle between the two membrane portions, such that the deformation of the side wall membrane that is thus caused likewise reflects the pressure conditions within the pressurized tube. Means for detecting deformation of a membrane are arranged on the outer side of the side wall membrane so that they are not in contact with the medium whereof the pressure is to be measured. Because of the arrangement of the first membrane portion in the cross section of the tube as a separating membrane, the conventional pressure sensor arrangement can be used both as an absolute pressure sensor and also as a differential pressure sensor, depending on whether a defined reference pressure applies on the one side of the separating membrane or a measuring pressure acts on both sides of the separating membrane. The conventional pressure sensor arrangement is provided for use in the context of monitoring diesel particle filters, in order to measure the exhaust gas pressure upstream and downstream of the particle filter and thus to determine the extent to which it is loaded. Here, in contrast to process instrumentation, a static pressure occurs that is at most small. In the pressure sensor arrangement described, however, and disadvantageously, the differential pressure measurement is highly dependent on the static pressure that results in particular in the deformation of the side wall membrane, and compensation thereof is possible only to an inadequate extent, because it requires exact positioning of the expansion sensor that is applied to the tube outer wall, which in practice can hardly be achieved to the necessary level of accuracy.

DE 93 00 776 U1 discloses a pressure sensor that has a can-shaped housing divided into two measuring chambers by an annular membrane. The membrane is given a corrugated shape by centrally arranged rings and, in the central region, takes the form of a disk-shaped pressurized wall. A pressure difference between the two measuring chambers results in an axial displacement that is detected by an inductive sensor. Disadvantageously, the inductive sensor here is arranged within a measuring chamber.

SUMMARY OF THE INVENTION

In view of the foregoing, it is an object of the invention to provide a pressure sensor arrangement that has a simple structural form and is at the same time suitable for use in a measuring transducer for process instrumentation.

This and other objects and advantages are achieved in accordance with the invention by a pressure sensor arrangement and a measuring transducer for process instrumentation having the pressure sensor arrangement in which a resilient mount is achieved by suspension using two limbs that extend substantially parallel to a plane of the membrane and which are rotationally symmetrical in relation to the axis of the tube of the pressure sensor arrangement.

The invention has the advantage that an axial displacement of the membrane, which takes a flexurally rigid form and is axially resiliently mounted in the tube in an edge region, occurs in the vicinity of the tube wall and it is thus possible to detect this axial displacement by measurement so to speak from the outside.

In particular, in comparison to the conventional pressure sensor arrangement disclosed in DE 196 08 321 C2, which was mentioned above in the introduction, the novel arrangement having a tube in the cross section whereof there is arranged a membrane acted upon by the pressure to be measured has the advantage that it is considerably simpler in its structural form, because no filling with oil, no corresponding overload protection system, no pressure-tight glass leadthrough and fewer welded connections are required. A sensor for detecting the axial displacement of the membrane may advantageously be arranged outside the chamber that is in contact with medium, such that there is no possibility of interaction between the sensor and the filling oil or process medium. As a result, a pressure sensor arrangement having good stability in the long term and a robust design is obtainable.

Since no filling oil is used, with the novel pressure sensor arrangement the problems mentioned with respect to restricted vacuum tightness, a relatively limited temperature range and an unsuitability for hygienic applications no longer occur with a measuring transducer equipped with the novel pressure sensor arrangement.

An advantageously simple shape comprising resiliently mounting the membrane in the tube in the axial direction, i.e., in a direction parallel to the axis of the tube, is obtained in that this mounting is achieved by suspension using two limbs that extend substantially parallel to the plane of the membrane and are rotationally symmetrical in relation to the axis of the tube. In this context, the term "substantially parallel" should be understood to mean that each of the limbs is inclined by an angle of at most 10° to the plane of the membrane. Here, the inclination is defined as the angle formed by a notional connection line, which connects in a straight line the points at which the limbs are connected to the membrane and to the tube, and the plane of the membrane, where the connection line intersects the axis of the tube. An inclination of the two limbs suspending the membrane about a small angle to the plane of the membrane may, for example, be achieved in that two originally parallel limbs are displaced by a mechanical pre-stress out of their parallel position, which may also be designated the home position. In this way, the two limbs are always outside their home position, both at zero pressure and also over the entire pressure measuring range. An angled position of the limbs in this way has the advantage that it can prevent the possibility of a snap-action effect, i.e., the membrane undergoing a sudden axial displacement if the home position is overshot. Without this measure, the snap-action effect could possibly result in hysteresis in a measurement signal obtained from the means for detecting displacement.

For the purpose of forming the two limbs, the end face of the membrane is provided with at least one groove that projects radially into the membrane. This has the advantage that, with a particularly simple construction and uncomplicated manufacture, a suspension having two flat and substantially mutually parallel or (with the pre-stressing of the above-described limbs) angled annular disks is obtained as a resilient system whereof the arrangement in a longitudinal section along the axis of the tube is similar to a parallelogram or a trapezium, with a small angle of opening between the limbs.

In principle, an enormous variety of measuring methods may be used to detect the axial displacement of the membrane, which is dependent on the pressure to be measured. For example, an optical measurement using lasers, a capacitive measurement using suitably mounted electrodes, a magnetic or an ultrasonic measurement may be used. However, an embodiment of the invention in which expansion absorbers are applied to the two inner sides of the limbs (i.e., mutually facing sides of the limbs) for the purpose of detecting the flexion of the limbs that is dependent on the displacement of the membrane has proved particularly advantageous. This has the advantage that the two expansion absorbers, which in the present disclosure are also designated sensors, are deflected in opposing directions. That is, while the one sensor undergoes an expansion, the sensor applied to the opposite side is compressed. The two sensors thus generate a bidirectional measurement signal that can be evaluated by a subsequent signal processing, for the purpose of determining the displacement and hence the pressure to be measured. Thus, advantageously a compensation of temperature factors or static pressure is made possible.

An overload protection that can prevent plastic deformation or rupture of the limbs in the event of a pronounced pressure load is obtainable via a particularly simple construction if mechanical stop elements that are distributed over the peripheral region of the membrane are provided for the purpose of limiting membrane displacement. Particularly advantageously, the measures for overload protection are separated from the process medium and, in particular in the case of aggressive media, are protected therefrom if the mechanical stop elements are arranged between the limbs and are formed as pins or webs that are connected to the tube with mechanical rigidity and project into corresponding recesses in the end face of the membrane. Likewise separated from the process medium, and moreover connected with particularly little manufacturing complexity, is an overload protection in accordance with an embodiment in which the membrane has on its end face a peripheral groove into which a corresponding web, which is secured to the tube, projects for the purpose of forming a mechanical stop element.

Because of the robustness, the compressive strength and the vacuum tightness, and its insensitivity to static pressure and temperature, the novel pressure sensor arrangement is particularly suitable for use as a measuring cell or absorber in a measuring transducer for process instrumentation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and embodiments and advantages will be explained in more detail below with reference to the drawings, in which exemplary embodiments of the invention are illustrated, in which.

DETAILED DESCRIPTION OF THE EXEMPLARY EMBODIMENTS

Figure 1:
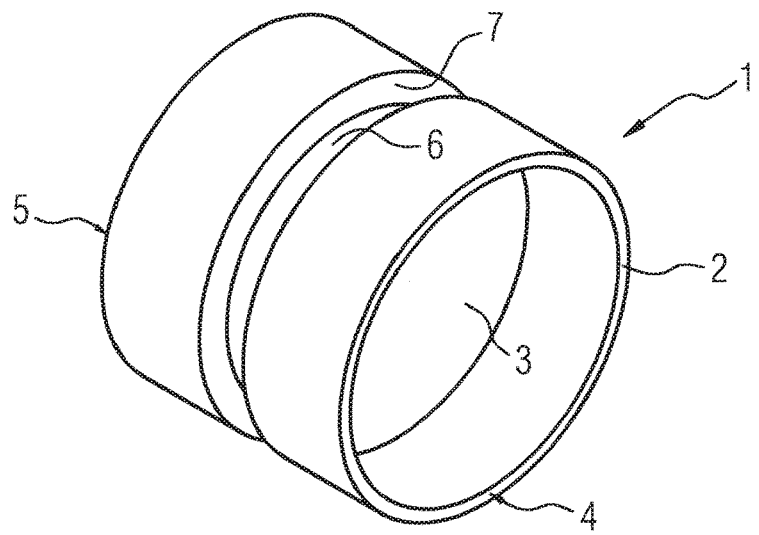
FIG. 1 shows a perspective view of a pressure sensor arrangement in accordance with the invention.

In the figures, like parts are provided with like reference numerals.

In the perspective view of FIG. 1, the basic shape of a pressure sensor arrangement 1, having a tube 2 in the cross section whereof there is arranged a membrane 3 on which the pressure to be measured acts, is readily recognizable. When the illustrated pressure sensor arrangement 1 is used in a pressure measuring transducer for process instrumentation, the two ends 4 and 5 of the tube 2 can be closed off by a respective cap (not illustrated in FIG. 1) through which a process medium at the pressure to be measured can be supplied to one side of the membrane 3, in the case of an absolute pressure sensor, or to both sides of the membrane 3, in the case of a differential pressure sensor. An electronic unit for evaluating the electrical signals that are generated by the pressure sensor arrangement 1, and which depend on the respective pressure to be measured, can take a conventional form and is likewise not illustrated in FIG. 1. It is clear from FIG. 1 that, when a membrane 3 that is mounted in the tube 2 to be axially resilient in the edge region 6 is used, the structural form of a differential pressure measuring cell is made considerably simpler than that of a conventional measuring cell, with an overload protection system and filling oil, as a diaphragm seal.

In the case of a differential pressure measuring transducer, the process medium is guided directly to both sides of the membrane 3, there is no need for oil filling and complex construction of an overload protection system, the requirement for welding procedures is only limited, and a pressure-tight glass leadthrough for electrical signals can be dispensed with. Moreover, the tube 2 and the membrane 3 can be made predominantly by lathing. The dimensions of the measuring cell can be made such that, with respect to its mechanical interfaces with the other components of a measuring transducer, it is compatible with conventional measuring cells, with the result that only the measuring cell, i.e., the pressure sensor arrangement 1 shown, has to be changed, and flange parts or housings can be taken over from the conventional measuring transducer. The membrane 3 is a relatively thick disk-shaped membrane with a high flexural rigidity in the central region, and is provided with a groove in the edge region 6. The central groove produces two limbs of the same thickness, of which only one limb 7 is visible in FIG. 1. The two limbs have relatively low flexural rigidity and thus ensure that the membrane 3 is mounted axially resiliently as mentioned.

Figure 2:
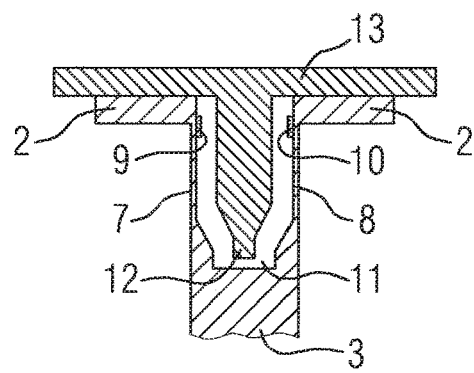
FIG. 2 shows a longitudinal section of an edge region of a pressure sensor arrangement in accordance with the invention.

In FIG. 2, the two limbs 7 and 8, which resemble a parallelogram in the sectional drawing, are readily visible in the detail shown of a longitudinal section through the arrangement 1. Two expansion absorbers 9 and 10 are applied to the mutually facing sides of the limbs 7 and 8, at locations that are subjected to high mechanical stresses when there is an axial displacement of the membrane 3. In this exemplary embodiment, the two limbs 7 and 8 extend substantially parallel to the center plane of the membrane 3. A mechanical stop element for limiting displacement in the event of overload is formed as a peripheral groove 11 that is made in the end face of the membrane 3 and into which there projects a corresponding web 12 of smaller width. The web 12 takes a flexurally rigid form and is a constituent part of an overload ring 13, which is fixedly connected to the tube 2.

Figure 3:
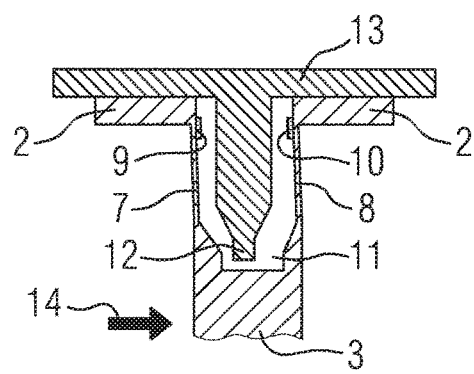
FIG. 3 shows the edge region in accordance with FIG. 2 under load.
Figure 4:
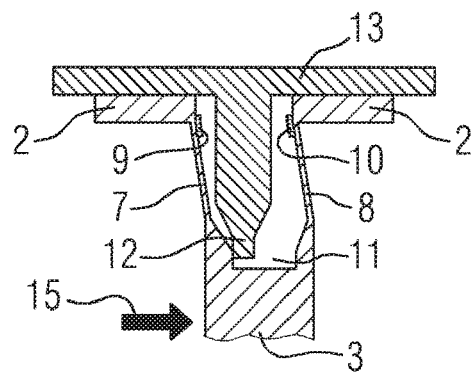
FIG. 4 shows the edge region in accordance with FIG. 2 under overload.

If, for example, there is a higher pressure 14 on the left-hand side of the membrane 3 than on the right-hand side, then the membrane 3 undergoes a displacement in a direction parallel to the tube axis, as illustrated in FIG. 3. During this, the two expansion absorbers 9 and 10 are subjected to mechanical stresses that have different signs. While the left-hand expansion absorber 9 undergoes a compression, the right-hand expansion absorber 10 is stretched. If, unlike the situation illustrated, a higher pressure is applied on the right-hand side of the membrane 3, then the behavior is accordingly reversed and the left-hand sensor 9 is stretched while the right-hand sensor 10 is compressed. The two sensors or expansion absorbers 9 and 10 thus generate opposing measurement signals, which can be evaluated in a conventional manner. Errors resulting from disturbance variables, such as temperature or static pressure, can thus largely be compensated.

If the membrane 3 is under load by a pressure 15 that exceeds the limit for overload, then excessive movement of the membrane 3 is prevented by a mechanical stop element, because the flexurally rigid web 12 abuts against a side wall of the groove 11. Analogously, excessive displacement of the membrane 3 in the opposite direction is prevented. Advantageously, the sensors 9 and 10 and the mechanical stop element for overload protection do not come into contact with a process medium.

The sensitivity to pressure of the described arrangement 1 depends, among other things, on the surface area of the membrane 3 (which because of its rotationally symmetrical form is characterized by the membrane diameter), on the wall thickness of the limbs 7 and 8 by which the membrane 2 is suspended axially displaceably in the tube 2, and by the length of the limbs 7 and 8 in the radial direction relative to the geometry of the membrane 3. Broadly speaking, any desired pressure measurement ranges may be produced by the dimensioning of these parameters. The measuring cell is dry, i.e., it has no oil filling, and has a relatively simple form and, if the overload ring 13 (FIG. 2) is of a segmented construction, can be lathed largely from one piece. Further, the measuring cell is advantageously vacuum-tight and can be operated in a broad temperature range, which is limited primarily by the properties of the sensors 9 and 10.

Figure 5:
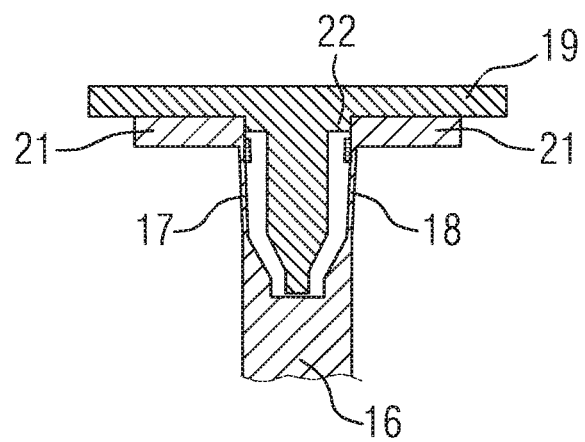
FIG. 5 shows an edge region of a pressure sensor arrangement in accordance with the invention with pre-stressed limbs.

In accordance with the alternative embodiment of the pressure sensor arrangement shown in FIG. 5, there is a possibility of resiliently mounting a membrane 16 having two limbs 17 and 18 that are inclined by a small angle in relation to the plane of the membrane 16. To maintain the pre-stressing that is required for this, an overload ring 19 that is connected on both sides to a tube 21 may be provided with a small projection 22 that spreads the limbs 17 and 18. The described pre-stressing may be performed subsequently, when the pressure sensor arrangement is assembled, based on lathed parts that are similar to those described above.

To prevent the snap-action effect, limbs may also be inclined, in a manner different from the exemplary embodiment illustrated in FIG. 5, with respect to the plane of the membrane by a respective angle of negative value and of positive value, such that the spacing between the two limbs is reduced as the distance from the axis of the tube increases.

Figure 6:
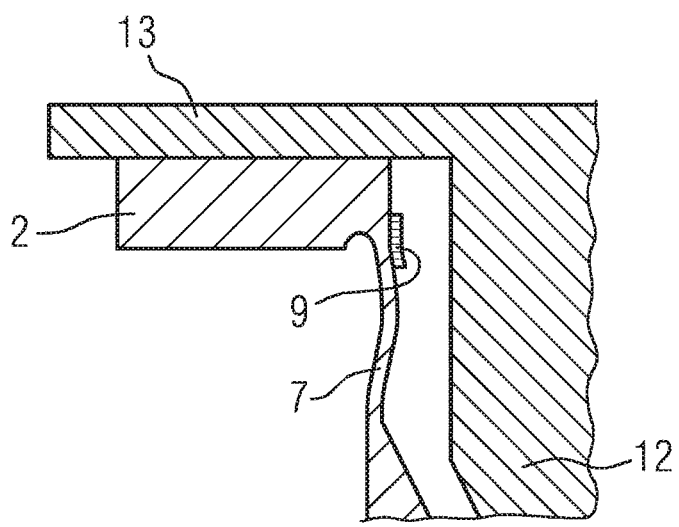
FIG. 6 shows a longitudinal section of a limb for the purpose of illustrating the behavior under static pressure.

Static pressure is applied to both sides of the membrane 3 at the same time and results in the limbs being deformed substantially in an S shape, as illustrated by the example of the limb 7 in FIG. 6. The described pressure sensor arrangement is advantageously able to measure static pressure as well. This is possible because, under static pressure, the two limbs suspending the membrane flex toward one another in a mirror-symmetrical arrangement. Both pressure absorbers, i.e., the pressure absorber 9 illustrated in FIG. 6 and the pressure absorber (not illustrated) on the opposing limb, undergo compression in this case and thus emit a sensor signal of the same sign, also designated a common-mode signal. The membrane 3 itself remains at the same location during this provided the differential pressure is unchanged.

Figure 7:
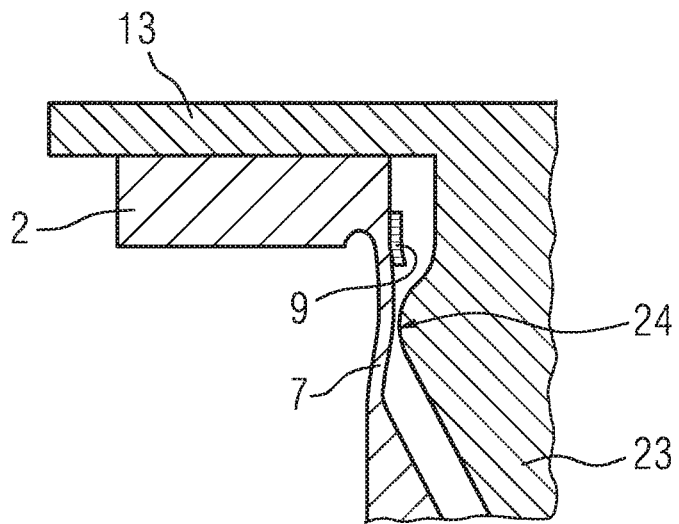
FIG. 7 shows a longitudinal section of a limb with protection against overload in respect of static pressure.

FIG. 7 illustrates a further overload protection. This limits deformation of the limb 7 if, under very high pressure, the limb 7 in the membrane suspension threatens to flex excessively. Here, the limb 7 bears against a support contour 24, which is provided for this purpose, of a web 23, and further flexing is prevented.

Figure 8:
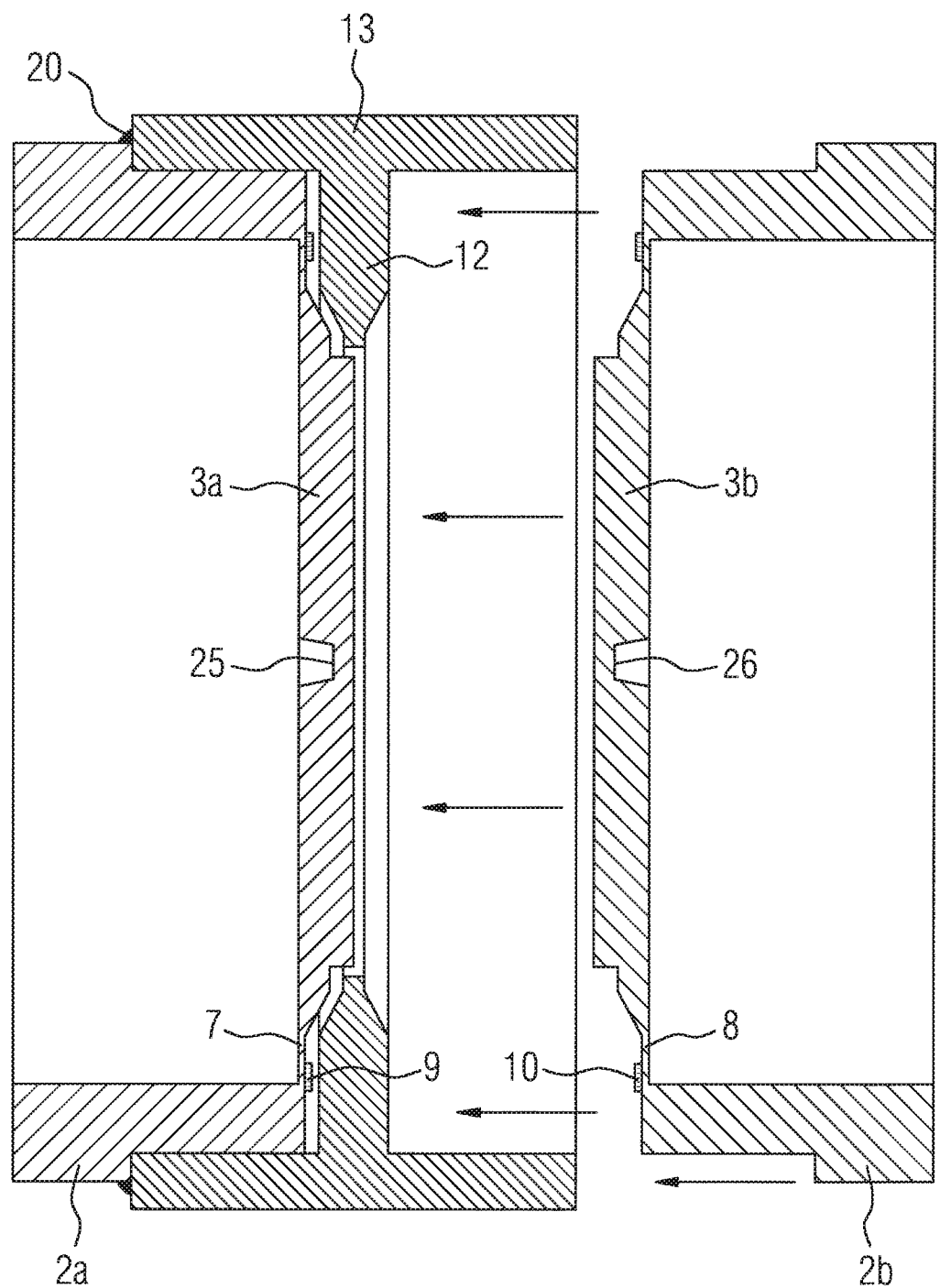
FIG. 8 shows an exploded drawing for the purpose of illustrating a possible mounting of a pressure sensor arrangement in accordance with the invention.

FIG. 8 illustrates a possible method for manufacturing a pressure sensor arrangement. First, two rotationally symmetrical tube halves 2a and 2b, with membrane halves 3a and 3b respectively, and the overload ring 13 with the web 12, are each produced by lathing, as one-piece constituent elements. Expansion absorbers 9 and 10 are applied to the sides of the limbs 7 and 8, which in the assembled condition face one another. At the moment of assembly that is illustrated in FIG. 8, the overload ring 13 has already been pushed onto the tube half 2a and fixed there by a peripheral weld seam 20, which was produced, for example, by laser welding. As indicated by arrows in FIG. 8, the second tube half 2b having the membrane half 3b is then joined on. Thereafter, the two membrane halves 3a and 3b are welded to one another by spot welding at recesses 25 and 26. Finally, the overload ring 13 and the tube half 2b are welded to one another by a further peripheral laser weld seam at the butting point, which is accessible from outside. The spot welding connects the two membrane halves 3a and 3b to give one membrane 3. The membrane 3 is rigid. Consequently, no adverse effects on the measurement properties of the pressure sensor arrangement need be expected from the spot weld, because the membrane 3 does not undergo any flexing. The required precision during assembly can be achieved by defined measurement tolerances of the lathed parts. Defined abutment points and the use of a suitable welding set enable a simple assembly of high precision.

In accordance with an alternative manufacturing method, the tube 2 and the membrane 3 as illustrated in FIG. 1 are manufactured as a one-piece lathed part, and the overload protection is manufactured as a plurality of molded parts. The two sensors are applied to the mutually facing sides of the limbs, introduced into the lathed part. The molded parts of the overload protection, which project into the groove as described above for the purpose of forming a mechanical stop element in the edge region 6 of the membrane 3, are now fitted in and welded to the tube 2. The molded parts may comprise two semi-circular halves, which when brought together correspond to the overload ring 13 described above, or may comprise a plurality of insert parts, such as three, which are distributed over the peripheral region and each have a pin that projects into the groove, for the purpose of forming mechanical stop elements.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A pressure sensor arrangement, comprising:
   a tube;
   a membrane, upon which pressure to be measured acts, arranged in a cross section of the tube, the membrane having a high flexural rigidity in a central region and being mounted axially resiliently in the tube in the edge region; and
   means for detecting an axial displacement of the membrane which is dependent on the pressure to be measured;
   wherein the resilient mounting is achieved by suspension using two limbs which extend substantially parallel to a plane of the membrane and which are rotationally symmetrical in relation to an axis of the tube; and
   wherein an end face of the membrane includes at least one groove that projects radially into the membrane to form the two limbs.

2. The pressure sensor arrangement as claimed in claim 1, wherein the two limbs are provided on their mutually facing sides with expansion absorbers to detect a flexion of the limbs which is dependent on the axial displacement of the membrane.

3. The pressure sensor arrangement as claimed in claim 1, wherein the two limbs are provided on their mutually facing sides with expansion absorbers to detect a flexion of the limbs which is dependent on the axial displacement of the membrane.

4. The pressure sensor arrangement as claimed in claim 1, further comprising:
   mechanical stop elements distributed over a peripheral region of the membrane for limiting membrane displacement.

5. The pressure sensor arrangement as claimed in claim 4, wherein the mechanical stop elements comprises one of pins and webs which are connected to the tube with mechanical rigidity, project into corresponding recesses in an end face of the membrane and which are arranged between the two limbs.

6. The pressure sensor arrangement as claimed in claim 1, wherein, for limiting membrane displacement the membrane includes a peripheral groove, between the two limbs, into which a corresponding web projects which is connected to the tube with mechanical rigidity, in order to form a mechanical stop element.

7. A measuring transducer for process instrumentation having the pressure sensor arrangement as claimed in claim 1.

* * * * *